United States Patent
Distler et al.

(10) Patent No.: US 7,946,541 B2
(45) Date of Patent: May 24, 2011

(54) PIPE/CABLE ENCLOSURE AND METHOD FOR ENCLOSING PIPES AND CABLES

(75) Inventors: Peter Distler, Möhrendorf (DE); Tihomir Hudak, Langensendelbach (DE); Bernd Maciejewski, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 24 days.

(21) Appl. No.: 12/291,175

(22) Filed: Nov. 6, 2008

(65) Prior Publication Data

US 2009/0121088 A1 May 14, 2009

(30) Foreign Application Priority Data

Nov. 9, 2007 (DE) .................. 10 2007 053 562

(51) Int. Cl.
*F16L 3/08* (2006.01)
*H02G 3/06* (2006.01)
(52) U.S. Cl. ....... 248/74.2; 174/481; 174/492; 248/74.3
(58) Field of Classification Search .................... 248/65, 248/74.4, 300, 315, 49, 53, 57, 68.1, 74.1–74.3, 248/316.7; 220/6, 62, 62.1; 174/72 C, 492, 174/481, 101, 71 R, 93, 504; 285/134.1, 285/285.1, 424; 229/103.2, 203; 138/118.1, 158, 168

See application file for complete search history.

(56) References Cited

U.S. PATENT DOCUMENTS

| | | | | |
|---|---|---|---|---|
| 3,462,065 A | * | 8/1969 | Asman | 229/109 |
| 3,741,380 A | * | 6/1973 | Carney | 206/783 |
| 3,906,126 A | * | 9/1975 | Kaiser et al. | 428/35.9 |
| 4,123,575 A | * | 10/1978 | Wesch et al. | 427/386 |
| 4,606,461 A | * | 8/1986 | Bolton, Sr. | 206/600 |
| 4,725,463 A | * | 2/1988 | Baumber et al. | 428/33 |
| 5,283,099 A | * | 2/1994 | Smith et al. | 428/116 |
| 6,595,363 B2 | * | 7/2003 | Peters | 206/423 |
| 7,330,637 B2 | * | 2/2008 | Kobayashi | 386/46 |
| 2005/0072839 A1 | * | 4/2005 | Niimi | 229/122.2 |
| 2007/0056763 A1 | * | 3/2007 | Kelly | 174/135 |

FOREIGN PATENT DOCUMENTS

DE 102006046318 A1 4/2008

* cited by examiner

*Primary Examiner* — Tan Le (57) ABSTRACT

The invention relates to a pipe/cable enclosure for pipes and cables of a medical diagnostic device, said enclosure surrounding the pipes/cables running from the diagnostic device to a partition wall and having at least one folding wall element with folds which, in the assembled state, is disposed folded at the folds around the pipes/cables, thus surrounding the pipes/cables.

13 Claims, 4 Drawing Sheets

PIPE/CABLE ENCLOSURE AND METHOD FOR ENCLOSING PIPES AND CABLES

CROSS REFERENCE TO RELATED APPLICATIONS

This application claims priority of German application No. 10 2007 053 562.9 filed Nov. 9, 2007, which is incorporated by reference herein in its entirety.

FIELD OF THE INVENTION

The present invention relates to a pipe/cable enclosure for pipes and cables of a medical diagnostics device and to a method for enclosing pipes and cables.

BACKGROUND OF THE INVENTION

Medical diagnostic devices require incoming and outgoing pipes and cables, e.g. for energy supply. In the case of a magnetic resonance system, pipes and cables emerge from the device housing in an upper section of the device and run, for example, to the ceiling of a cage surrounding the magnetic resonance system, pass through the ceiling and are routed away out of sight of the user. In the area between the housing and ceiling the pipes and cables are visible to a system user such as a doctor or patient. To conceal and protect the pipes and cables, but also to remove the heat produced by the electronics, an enclosure is generally installed around the pipes and cables, a so-called tower enclosure or enclosure tower.

Conventional enclosures for these pipes and cables consist of a plurality of shaped plastic sections. Glass reinforced plastic (GRP), for example, is used as the plastic material. Tower enclosures made of medium density fiberboard (MDF) in conjunction with a fireproof paint have likewise been used. The enclosure has hitherto been fixed both to the housing of the magnetic resonance system and to the cage ceiling, the plastic sections being designed to slide into one another telescopically to enable different gaps between housing and ceiling to be bridged. A conventional enclosure of this kind has a number of disadvantages. First, a number of sections are required which possibly have to be specially molded for the particular application. Since a plurality of sections are used and because of the material, the enclosure is generally comparatively heavy, which has disadvantages in terms of both transporting and installing the enclosure. The enclosure has to be fixed both to the ceiling and to the housing of the medical diagnostic device. Fixation to the ceiling is particularly disadvantageous, since the ceilings are often of very different constitution in the different environments in which such a device is installed, which means that no uniform fixing method or fixing means can be provided. Also, a conventional enclosure of this kind is difficult to dismantle, which has disadvantages for maintenance, e.g. for helium refilling. In addition, the costs of manufacturing and assembling a conventional enclosure are comparatively high.

SUMMARY OF THE INVENTION

The object of the invention is to provide an enclosure for pipework/cabling of medical diagnostic equipment that is lightweight, inexpensive and easy to install, as well as a method of fitting such an enclosure around the pipes and cables.

This object is achieved with a pipe/cable enclosure and a method for enclosing pipes and cables as claimed in the independent claims. The dependent claims describe advantageous embodiments of the invention.

According to the invention there is provided a pipe/cable enclosure for pipes and cables of a medical diagnostic device, said enclosure surrounding the pipes and cables running from the diagnostic device to a partition wall, and having at least one folding wall element with folds which in the mounted state is disposed folded at the folds around the pipes and cables so as to enclose the pipework/cabling. In the present context said pipework/cabling includes electrical cables as well as pipes for removing and supplying gases or liquids (e.g. water pipes), and also connecting elements such as rods or chains running between the medical diagnostic device and the partition wall. Medical diagnostic devices are, for example, a magnetic resonance imaging system or a computed tomography system. The partition wall is generally a ceiling, e.g. the ceiling of an RF cage, but the partition wall can also be a lateral wall or the wall of an electrical cabinet or similar. Preferably one wall element is used, though two or more wall elements can also be used which are then disposed such that they surround the pipes and cables. The at least one wall element of a pipe/cable enclosure implemented in this way can be made from a plurality of inexpensive and lightweight materials. Since the wall element acquires structural stability by being folded at the folds, and since in addition it is preferably lightweight, no fixing to the partition wall is generally required, which considerably facilitates installation of the pipe/cable enclosure according to the invention. It is greatly advantageous if no fixing e.g. to the ceiling of an RF cage is necessary, since these ceilings are often of different constitution and can make fixing difficult. The folding of the at least one wall element enables the pipe/cable enclosure to be easily installed around the pipes and cables, and also correspondingly easily dismantled, which is advantageous if the enclosure has to be removed for pipework/cabling maintenance. Cost savings are achieved by the ease of installation and dismantling of the enclosure, and also by the possibility of using an inexpensive material for the wall element. The use of a lightweight folding wall element also saves transportation costs. The folding wall element is preferably easily workable e.g. by cutting, thereby enabling the width of the wall element to be easily matched to the gap between the housing of the diagnostic device and the partition wall. This further facilitates the assembly of the pipe/cable enclosure.

The wall element of the pipe/cable enclosure preferably has a planar element and a dimension-stabilizing element, as well as cavities between the planar element and the dimension-stabilizing element. A wall element implemented in this manner is both dimensionally stable and lightweight. According to one embodiment, the wall element has an inner skin and an outer skin as well as an intermediate honeycomb structure. An example of such a wall element is a honeycomb board in which a honeycomb structure runs perpendicular to the surfaces of the inner and outer skin. The term inner skin denotes the material on the side of the wall element which is on the inner side of the pipe/cable enclosure in the direction of the pipes and cables. The inner and outer skin can be made of different or identical materials. For the outer skin a décor paper, particularly a fire resistant one, can be used, for example. A wall element implemented in this way is lightweight and has high structural stability. The wall element preferably comprises corrugated board. Corrugated board has an internal structure that is essentially honeycomb, and which generally extends parallel to a flat layer of paper or board. Corrugated board can have a flat layer and a corrugated layer, two flat layers with an intermediate corrugated layer, or a plurality of alternately disposed corrugated and flat layers. A five-ply corrugated board is preferably used. Corrugated board has the advantage that it has comparatively high structural stability yet is very lightweight, is easy to work, and can be inexpensively produced. Since the width of a wall element of corrugated board can be easily matched to the gap between medical diagnostic device and partition wall, e.g. by cutting to size, installation of the pipe/cable enclosure is simplified. In addition, corrugated board can be produced with predetermined folds, thus simplifying folding and therefore installation of the wall element. Another advantage is that corrugated board and honeycomb board are easy to recycle, thereby saving subsequent disposal costs and preventing pollution of the environment. These are significant advantages compared to a conventional GRP enclosure.

According to another embodiment, the wall element comprises a polypropylene hollow board. A polypropylene hollow board is likewise lightweight while possessing good structural stability. Polypropylene hollow boards are also readily available, inexpensive and easily workable.

According to an embodiment of the invention, a fireproof paint is provided on one surface of the wall element. The surface can be an inward or outward facing surface of the wall element, and the paint can also be provided on the entire wall element. In the event of a fire, e.g. a cable fire, this enables the flames produced to be prevented from penetrating to the outside. Rapid ignition of the wall element can also be prevented. In addition, a fireproofing element is preferably provided at a predefined distance from an internal perimeter of the wall element. For example, the fireproofing element can be placed directly against the inside of the wall element, i.e. the side of the wall element facing the pipes/cables, or can be located at a predetermined distance from the wall element which can vary along the perimeter. A fireproofing element can comprise e.g. fire-retardant protective foils which are applied to a wall element or around the pipes/cables, fireproof tubes (zipper tubes) or fire-retardant textiles of the type used e.g. for fire department clothing. The fireproofing elements can be both fixed to the wall element and placed around the supply pipes and cables and/or fastened to same. The fireproofing element preferably extends from the housing of the medical diagnostic device to the partition wall. The fireproofing element enables flames to be prevented from penetrating to the outside in the event of a fire inside the pipe/cable enclosure, and also prevents the wall element of the pipe/cable enclosure from catching fire in a short time. This reduces the risk of a fire spreading. In addition to or instead of the abovementioned fireproofing elements, it is also conceivable for the corrugated board to be made from low-flammability paper.

The wall element preferably comprises synthetic-resin-coated, laminated or synthetic-resin-impregnated board. Board here encompasses the paper, paperboard or combined board thickness range generally used for the production of corrugated board. A fluted layer of corrugated board can have, for example, a weight per unit area of 100 g/m$^2$, whereas honeycomb board can have e.g. more than 4000 g/m$^2$ substance. Synthetic resin treatment of this kind has the advantage that the wall element can be made more structurally stable, and that moisture sensitivity can be reduced. Conventional paperboard or corrugated board generally swells up due to moisture which can be produced by condensation, for example, when a magnet of a magnetic resonance imaging system is being filled with helium. Corrugated board impregnated or coated with synthetic resin can resist the moisture, and any swelling, i.e. reduction in structural stability, can be avoided. In addition, corrugated board is known in which two fluted layers are laminated with a synthetic resin layer, thereby likewise increasing structural stability. Corrugated board of this kind can also be used. Low-flammability paper which can likewise be used for the corrugated board has the additional advantage that it is less sensitive to moisture than conventional corrugated board material.

The pipe/cable enclosure preferably comprises a molding having a U-shaped profile or an angular section and which is fixed to an area of the wall element opposite the partition wall. Such a molding can constitute a stabilizing strip which stabilizes the pipe/cable enclosure, and can also serve as a decorative or finishing strip. For example, an all-round molding in a single piece or consisting of a plurality of individual sections can be fixed to the wall element. For example, a molding can be bent through 45° at its ends, or mitered at 45°, thereby enabling two moldings to be butted together at folds of the wall element. The molding increases the stability of the pipe/cable enclosure and finishes the pipe/cable enclosure at the edge opposite the partition wall.

According to an embodiment of the invention, legs which extend inward from the meeting wall element edges in the direction of the pipework/cabling are implemented where wall element edges meet. If, for example, an individual wall element is folded around the pipework/cabling, two edges of the wall element, which extend essentially parallel to the pipes and cables, meet. At these edges, legs are formed which extend in the direction of the pipes and cables. For example, the wall element can be fabricated such that it has predetermined areas at which it can be folded in order to form the legs. The folds for forming the outer edges of the wall element when it is folded and the folds with which the legs are formed can therefore be of similar design. The embodiment has the advantage that the edges of the wall element can be simply joined together with the aid of the legs. Moreover, the structural stability of the pipe/cable enclosure is increased by the additional folds.

The molding is preferably provided with a leg which is disposed abutting an inner perimeter of the pipe/cable enclosure, the leg having two tab-like sections which are bent in the direction of the opposite side of the pipe/cable enclosure and are implemented such that they abut the inwardly extending legs of the at least one wall element. The molding can have e.g. a U-section, one leg of the U-section abutting an outer side of the wall element, and the other leg abutting the inner side of the wall element. The inner leg can be cut into centrally perpendicular to the longitudinal direction of the leg and along the longitudinal direction of the leg in order to form two tabs which can be bent away from the side of the wall element against which the molding abuts. Such a molding strip can be mounted to an area of the wall element where edges of the wall element meet and legs extend inward. The legs at the edges of the wall element can then be held together by inserting them between the tabs, the tabs being bent in the process and pressing the legs together because of a restoring force with which they want to return to their original position. The advantage of a molding of this kind is that it both increases the structural stability of the enclosure and serves to connect the two ends of the wall element. Therefore, no additional parts are required for connecting the ends of the wall element, resulting in further cost savings and easier assembly of the enclosure.

According to another embodiment of the invention, the pipe/cable enclosure comprises a molding which has an H-shaped section with two oppositely arranged grooves, the molding being disposed so as to connect meeting edges of the wall element and the grooves being implemented such that they at least partly accommodate the meeting edges. For example, if the pipe/cable enclosure comprises a wall element which is folded around the pipes and cables, the two edges of the wall element which can be connected by such an H-shaped molding meet. This can be done, for example, by bonding one edge in a groove of the molding and then sliding the second edge of the wall element into the opposite groove of the molding. Although both edges of the wall element can be bonded to the molding, it is also conceivable to retain the edges in the grooves using a kind of press fit. Such a molding is a cost-effective fastening means which is easy to install. For connecting the meeting edges of the wall element a certain tolerance requirement may exist, i.e. the edges may not meet precisely in certain circumstances, but a narrow gap remains between the edges in the assembled state of the wall element. Such a gap can be bridged by the molding described, for example, by providing deep grooves in the molding and only partially inserting one or both edges of the wall element into the grooves. The use of the molding described in conjunction with polypropylene hollow boards is particularly advantageous.

In another embodiment, meeting wall element edges are connected by using one or a combination of the following fastening means: snap buttons, hook-and-loop fasteners, retaining clips, hooks and eyes, guide aids. Said fastening means can be attached directly to the edges, for example, but can also be attached to legs formed at the edges, or to the outer or inner sides of the wall element in the vicinity of the edges. Snap button and hook-and-loop fasteners are preferably attached to legs formed at wall element edges. The above-mentioned fastening means have the advantage of enabling the pipe/cable enclosure to be repeatedly installed and dismantled in an easy manner.

The pipe/cable enclosure is preferably implemented such that it can be inserted into a molded shape formed on a housing of the medical diagnostic device. Such a shape can be e.g. an all-round notch, a depression over the area bounded by the enclosure, an all-round raised part, a combination of these or similar. For example, the shape can also comprise a plurality of depressions at predetermined locations in the housing, into which the corresponding projections of the enclosure can be inserted. A wall element can, for example, have one or more projections on two or more sides, and these projections are inserted into corresponding depressions in the housing of the medical diagnostic device. Equally, however, the lower edge of the wall element can be flat and have no projections, and be inserted into cutouts made in raised parts on the housing of the medical diagnostic device. Insertion of the enclosure into such a shape has the advantage that the position of the enclosure on the housing of the medical diagnostic device is fixed and the enclosure is structurally stabilized, e.g. against shear deformation parallel to a lateral surface.

According to another embodiment, at least one securing element is provided in an area of the wall element facing the medical diagnostic device, and a cutout is provided on a housing of the medical diagnostic device, said securing element engaging in said cutout in the assembled state of the enclosure. The cutout can be, for example, the cutout that must be provided in the housing for the pipe and cables passing through the housing. Other cutouts can also be provided which are used exclusively for insertion of the securing element. For example, in the vicinity of the lower edge of the wall element, i.e. the edge facing the housing, springs, latching elements or similar can be attached which engage in corresponding cutouts on the housing. The securing element can also be embodied as a single piece with the wall element, e.g. implemented as a hook-shaped molded part of the edge of the wall element facing the housing. Such securing elements provide additional securing of the position of the enclosure, and vibrations of the enclosure resting on the housing can also be reduced or prevented. For example, securing elements can be provided at four different positions around the wall element, but an all-round securing element is also conceivable.

According to another aspect of the invention, a housing of a medical diagnostic device is provided which comprises pipes and cables extending from a region of the medical diagnostic device to a partition wall, the housing having around this region at least one molded shape which is embodied such that it accommodates an enclosure as claimed in one of claims 1 to 13. The at least one shape preferably includes recesses and/or raised parts. For example, the housing can have a plurality of recesses into which projections formed on a wall element can be inserted, an all-round recess into which the edge of the enclosure near the housing can be inserted, or a planar recess which extends over the length and breadth of the enclosure and is therefore able to accommodate the entire enclosure, the latter being retained in the recess e.g. by a kind of press fit. Alternatively, the housing can have raised parts on the inside and outside of a side of the wall element, the wall element being retained between these raised parts. Equally, however, the enclosure may have only raised parts which abut the outside of the circumferential wall element, the wall element again being held in a kind of press fit between these raised parts. The raised parts can be separate parts which are fastened to the housing during production or retrofit. However, the at least one shape is preferably made of a piece with the housing, thereby obviating the need for an additional assembly step during production of the housing. This also gives the housing very high strength which provides the housing with good stability with the aid of the shapes. The housing provided with shapes is particularly suitable for accommodating one of the above-described pipe/cable enclosures, since the latter can be flexibly folded and therefore matched to existing shapes in the housing. The pipe/cable enclosure is endowed with additional stability by the housing shaped in this way and shifting of the enclosure is prevented.

A method for enclosing pipework/cabling of a medical diagnostic device is also provided, wherein the pipes and cables run from the diagnostic device to a partition wall, the method comprising the following steps: providing at least one wall element with folds; cutting the wall element to a width essentially corresponding to a gap between a housing of the medical diagnostic device and the partition wall; folding the wall element around the pipes and cables at the predetermined folds, and connecting ends of the at least one wall element by means of at least one fixing element so as to form the enclosure surrounding the pipes and cables. Folding also includes simple bending or kinking, which is easily possible e.g. in the case of polypropylene hollow board. Therefore if, for example, two wall elements are used, the wall element ends which meet when the wall elements are folded around the pipes and cables are joined together by means of fixing elements. A fixing element can include, for example, an above-described molding or fastening means such as snap buttons, hook-and-loop fasteners, retaining clips or similar. In addition, the wall element is preferably inserted in at least one molded shape on the housing, the shape being implemented such that it at least partially accommodates an edge of the at least one wall element close to the housing. The cut size of the wall element is adapted accordingly in this case so that the wall element again extends from the housing to the partition wall even when it is inserted in shapes in the form of deeper recesses. The method described here enables an enclosure to be speedily installed around pipes and cables with little effort and at low cost and therefore advantageously. The method is also adaptable and also enables pipes and cables running across varying gaps between the housing of the medical diagnostic device and the partition wall to be enclosed. Moreover, the method described enables fixing of the enclosure to the partition wall to be dispensed with, which means that the constitution of the partition wall is immaterial and the method can be used in a multiplicity of environments.

BRIEF DESCRIPTION OF THE DRAWINGS

The invention will now be explained in greater detail with reference to the accompanying drawings, in which.

DETAILED DESCRIPTION OF THE INVENTION

Figure 1:
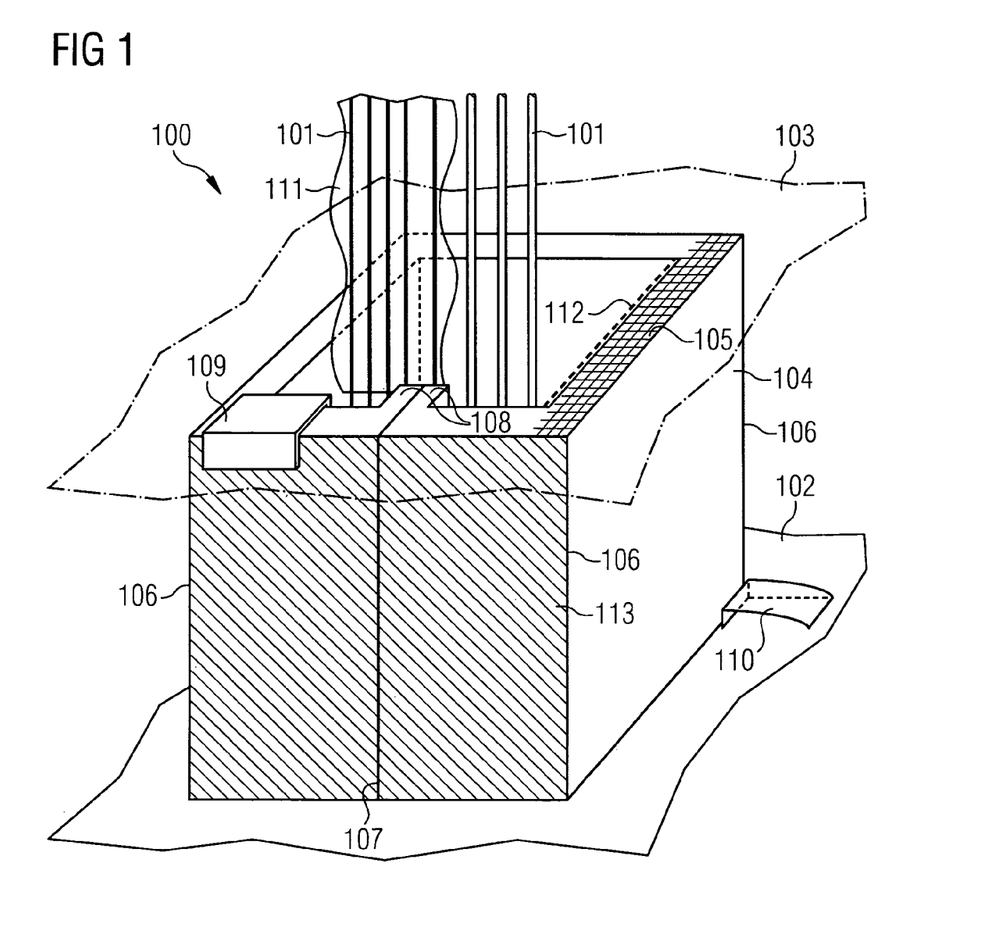
FIG. 1 is a schematic perspective view of an embodiment of the pipe/cable enclosure according to the invention.

FIG. 1 is a schematic drawing of an exemplary pipe/cable enclosure 100. Pipes and cables 101 run between a housing 102 of a medical diagnostic device and a ceiling 103 of a room in which the medical diagnostic device is installed. The pipe/cable enclosure 100 comprises a wall element 104 made from a lightweight material and has an internal honeycomb structure 105 which structurally strengthens the wall element. The wall element 104 preferably comprises corrugated paperboard, the ridges of an internal fluted structure running essentially perpendicular to the housing 102. The corrugated board is, for example, 5-ply with two outer and one inner flat layer and two intermediate fluted layers, with a thickness of 5-6 mm. The corrugated board is pre-treated, e.g. impregnated with synthetic resin, to increase the moisture resistance of the corrugated board. The pipes and cables 101 can include pipes transporting compressed gaseous helium for cooling, which can cause corresponding condensation moisture on the pipes. The pre-treatment of the corrugated board prevents the corrugated board from swelling because of the moisture or from otherwise losing its structural stability, e.g. due to delamination of various paperboard layers. In addition, a fireproof paint can be applied to the inner side, i.e. the side of the wall element 104 facing the pipes/cables. Flames produced in the event of a fire cannot therefore penetrate to the outside, and the wall element 104 is prevented from rapidly igniting.

In the present embodiment, a single wall element 104 is provided which is folded at the folds 106 so as to enclose the pipes and cables 101 and form an essentially rectangular footprint. The wall element 104 can be supplied e.g. in a flat state, predetermined areas of the wall element 104 being pre-formed for folding, and the folds 106 being formed by folding the wall element 104 at these areas.

Legs 108 are embodied at meeting edges 107 of the wall element 104. The legs 108 can be formed by folding the ends inward in the wraparound direction of the wall element 104 at predetermined areas, the predetermined areas forming the edges 107 after folding. The embodying of the legs 108 is advantageous for subsequent connection of the ends of the wall element 104. In addition, the enclosure 100 also has on its outer side an essentially flat surface in this joining area. Alternatively, two or more elements can also be provided which have a correspondingly larger number of connection points, it again being possible for legs similar to the legs 108 to be created at the connection points. Alternatively, a single wall element 104 can also be bent around the pipes and cables in an annular manner, in this case folds being provided at the wall element's meeting edges with the aid of which legs can be formed. A wall element 104 can also have a different number of folds 106, e.g. three, five or six, an enclosure with a different footprint being created accordingly by folding, e.g. a triangle, a pentagon or a hexagon. Preferably, however, a single wall element 104 with an essentially rectangular footprint in the folded state is used, since it offers good structural stability and can be easily assembled.

The pipe/cable enclosure 100 additionally has a molding 109. FIG. 1 shows only part of such a molding 109. The molding has a U-shaped section, but can also be implemented as an angular section. Preferably the molding 109 essentially extends over the entire extent of the upper edge of the wall element 104. The molding can be embodied here as one piece or consist of a plurality of segments which are e.g. mitered at 45° at the ends so as to dovetail at the folds 106. The molding 109 is used both to stabilize the pipe/cable enclosure 100 and also as a decorative or finishing strip. The molding 109 is preferably implemented such that it is seated with a kind of press fit on the upper edge of the wall element 104, thereby enabling the molding 109 to be easily mounted to the wall element 104 and the latter's stability to be improved.

The housing 102 has molded shapes 110. FIG. 1 shows such a molded shape 110 in the form of a raised part which is disposed such that it abuts an outer side of the wall element 104. A plurality of such shapes 110 can be disposed around the wall element 104, thereby fixing the wall element in position and reducing deformations of the wall element in directions parallel to the housing 102. An all-round molded shape 110 can also be provided. The molded shape 110 can also be implemented as a recess, e.g. in the form of an all-round notch or planar depression with internal cutout for the pipework/cabling. The wall element 104 is then preferably implemented such that its lower edge can be inserted in the all-round notch so that the wall element is firmly seated in the notch.

Other provided components of the pipe/cable enclosure 100 are a fireproofing tube 111 and a fireproofing foil 112. The fireproofing foil 112 can be applied all round the inner surface of the wall element 104, or only on predetermined areas of the wall element. The fireproofing tube 111 can be placed around all the pipes and cables or only around selected pipes and cables. In the event of a fire, e.g. a cable fire, both the fireproofing tube 111 and the fireproofing foil 112 can prevent the wall element 104 from easily catching fire and the flames from spreading. The enclosure 100 therefore likewise provides protection against possible fires. Further fireproofing means, such as fire-retardant textiles which are used for producing fire department clothing can likewise be provided as part of the enclosure, preferably between the wall element 104 and the pipes and cables 101.

The wall element 104 can also be externally painted or provided with a decorative covering 113. A layer of fire-retardant décor paper is preferably provided on the outer wall of the wall element. The painting can be done for visual reasons, but can also contribute to the moisture protection or fireproofing of the wall element 104. A decorative covering 113 can both increase the structural stability of the wall element 104 and enhance the appearance of the enclosure.

Hook-and-loop fasteners or snap button fasteners can be provided on abutting sides of the legs 108 in order to join the legs together, thereby facilitating repeated assembly and dismantling of the enclosure 100. However, the molding 109 can also be implemented such that it holds the legs 108 joined together. A molding implemented in this way is described below.

Figure 2:
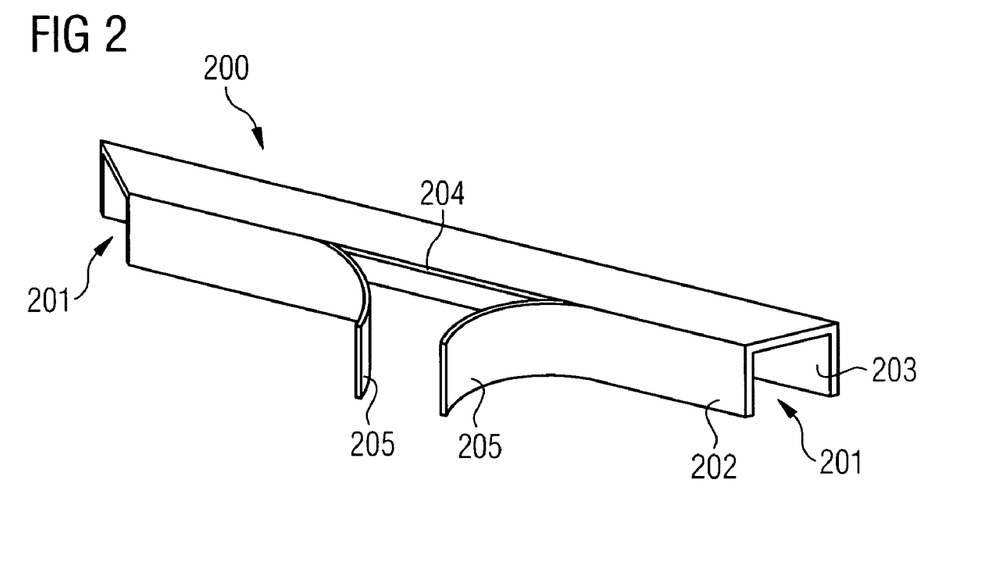
FIG. 2 and FIG. 3 schematically illustrate an embodiment of a fixing element in the form of a molding to which the ends of a wall element of the pipe/cable enclosure are connected.
Figure 3:
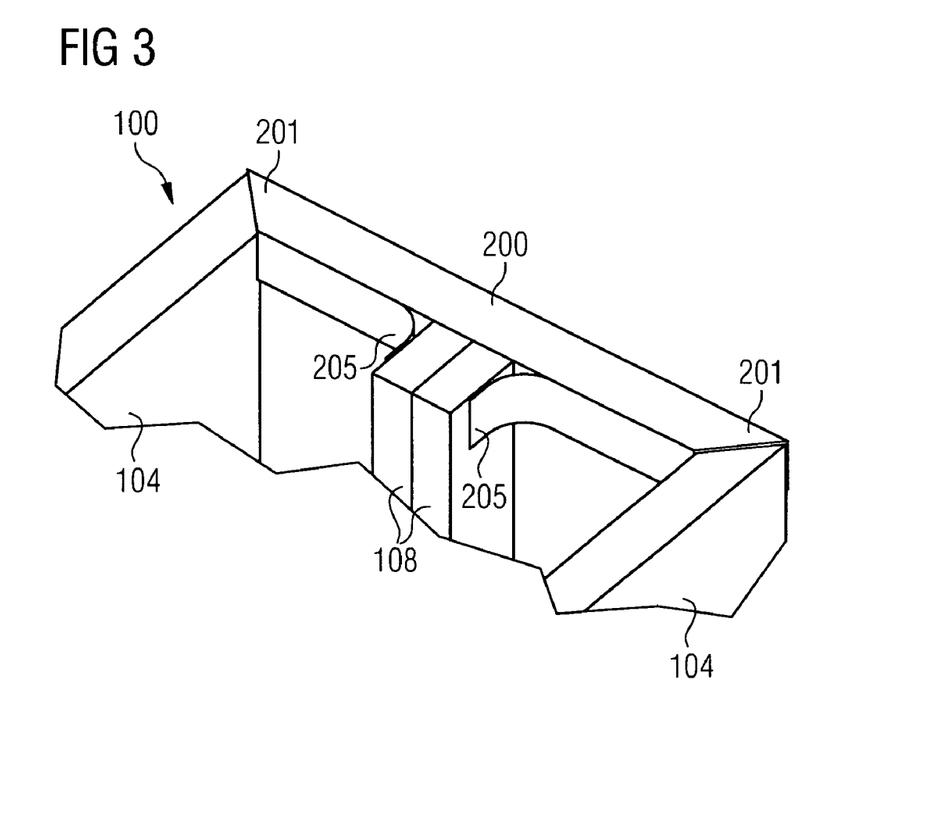

FIG. 2 schematically illustrates an exemplary molding which is embodied to hold together two legs of a wall element. The molding shown in FIG. 2 is made e.g. of plastic and has ends 201 which are miter-sawn or cut to 45°. The strip has a U-shaped section and comprises an inner leg 202 and an outer leg 203, the legs being inside and outside the enclosure respectively when the molding is attached to a wall element. The inner leg 202 is cut into at a location perpendicular to its extension direction and along a section 204 of the upper edge of the leg 202. These cuts produce two tabs 205 which, as shown in FIG. 2, can be bent away from the molding, i.e. in the direction of the pipes/cables in the case of a mounted molding. FIG. 3 shows the molding in a mounted state. Referring to FIG. 1, the molding 200 is mounted to an area of the wall element 104 in which legs 108 extend inward. Identical reference signs in the figures denote the same components in each case. The cuts made in the outer leg 203 of the molding 200 are implemented such that the legs 108 of the wall element 104 can be brought out of the molding through the cut area, as shown in FIG. 3. The bent tabs 205 abut the sides of the legs 108 and can press the latter together because of a spring force with which the tabs want to return to their initial position, i.e. in the plane of the inner leg 202. In a state prior to assembly, the tabs 205 can be in the same plane as the internal leg 202, or can be already bent forward as shown in FIG. 2. It is merely essential that the tabs 205 are forced apart by the legs 108 when the molding 200 is mounted to a wall element 104 so that the tabs press the legs 108 together in the mounted state. Moldings which are similar to the molding 200 but have no tabs 205 can be attached to the remaining upper edges of the wall element 104 and connect to the molding 200 at the ends 201. The molding 200 therefore constitutes a suitable means of stabilizing the wall element 104 and of connecting the ends of the wall element. A molding 200 is inexpensive to produce and is very easy to install. Furthermore an enclosure with a molding implemented in this way can be easily dismantled, e.g. to provide maintenance access to the pipes/cables or to the equipment, the cooling mechanism or the valve system of the medical diagnostic device (e.g. for ventilation/venting).

Figure 4:
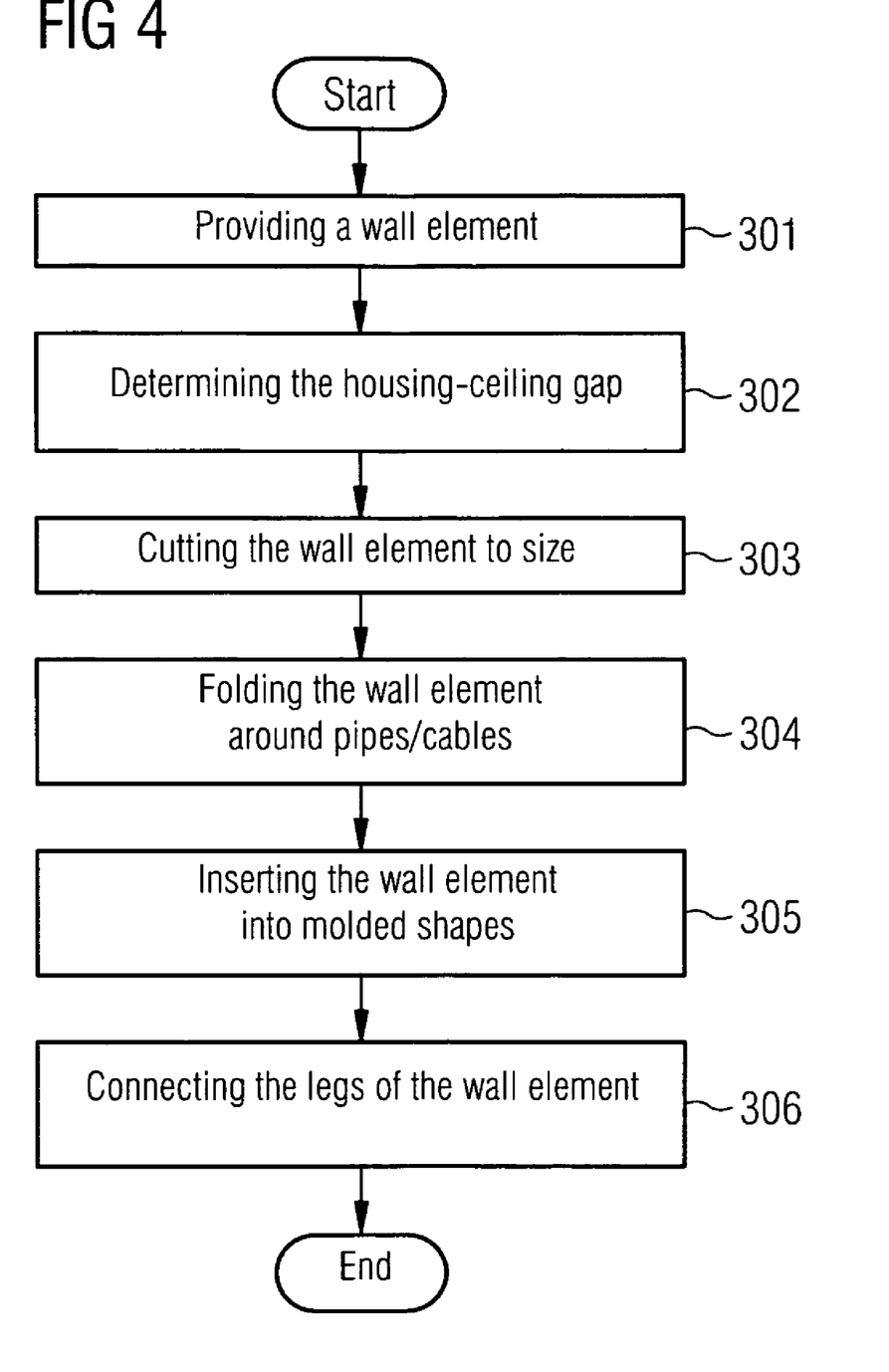
FIG. 4 is a flowchart of an embodiment of the inventive method for enclosing pipes and cables.

FIG. 4 shows a flowchart of an exemplary method for enclosing pipes and cables of a medical diagnostic device. In a first step 301 a wall element is provided which preferably consists of board or paperboard with an internal honeycomb structure, such as corrugated board or honeycomb boards. The wall element has prefabricated regions where the wall element can be folded. In addition, the wall element can be provided with coatings or painted in order to improve the moisture resistance, the fire resistance or the appearance of the wall element. In a next step 302, the gap over which the pipes and cables extend from the medical diagnostic device to the ceiling of the room in which the diagnostic device is installed is determined. The wall element is then cut to size in step 303 such that it can span this gap. The wall element width which in the mounted state runs essentially parallel to the pipes and cables is cut e.g. using a utility knife to a size essentially corresponding to the gap, if necessary allowing for recesses or raised parts on the housing of the medical diagnostic device.

In a next step 304 the wall element is folded around the pipes/cables. The wall element is folded at the predetermined areas in order to form folded edges which both give the enclosure its shape and increase the rigidity of the wall element. In addition, the ends of the wall element can if necessary be folded inward in order to form legs for connecting the ends. Prior to folding of the wall element, fireproofing elements can be attached if required. For example, a fireproofing foil can be applied to one side of the wall element which becomes an inner side in the assembled state, or a fireproofing tube can be placed around the pipes/cables.

When the wall element has been folded around the pipes/cables, in step 305 the wall element is inserted into molded shapes implemented on the housing of the medical diagnostic device. The molded shapes can be provided only at predetermined locations along the lower age of the wall element, which facilitates insertion, but they can also be provided along the entire perimeter of the wall element, thereby additionally increasing structural stability. In a next step 306 the legs of the wall element are connected. If hook-and-loop fasteners or snap button fasteners are provided on the legs of the wall element, these are connected to one another by pressing together. Alternatively or additionally, a molding as described in FIGS. 2 and 3 can be mounted to the upper edge of the wall element to connect the legs. The molding can be placed manually onto the wall element and presses the legs of the wall element together. A high degree of wall element stability can be achieved in particular by combining a fastening means with the molding. When the legs of the wall element are connected, the wall element essentially completely encloses the pipes and cables, thus completing the pipe/cable enclosure. For further structural stabilization, moldings e.g. with a U-shaped section can be mounted to the upper edge of the wall element. An essentially one-piece molding can be attached, or a plurality of individual moldings which meet e.g. at the folds of the wall element. To further increase stability and improve the visual appearance, a decorative foil can additionally be applied to the outer sides of the wall element. Preferably, however, such a foil is mounted such that the wall element can be easily dismantled.

Figure 5:
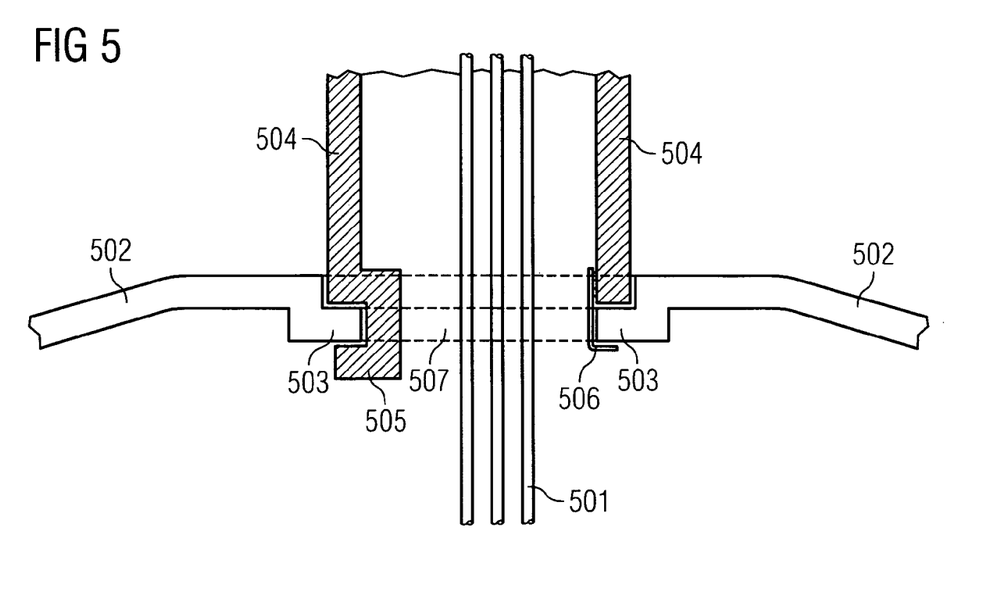
FIG. 5 schematically illustrates a region of an embodiment of the pipe/cable enclosure according to the invention.

FIG. 5 schematically illustrates part of the enclosure in another exemplary embodiment of the present invention. The cross-sectional view in FIG. 5 shows a wall element 504 which is seated in a molded shape 503 in the form of a planar recess with a cutout 507 for the pipes/cables 501, the molded shapes 503 being implemented in the housing 502 of a medical diagnostic device. The molded shapes 503 can be all-round as indicated by the dotted lines. The wall element 504 has two types of securing elements 505 and 506. The securing element 505 is embodied integrally with the wall element 504 (though it can also be bonded to the wall element as a separate part) and has a hook-shaped cross-section which allows it to be latched into the projection formed by the cutout 507 and the shape 503. In this case the securing element 505 therefore engages in the cutout 507 and acts in conjunction with the shape 503 to ensure a firm seating of the wall element 504 on the housing 502. For example, securing elements 505 can also be provided at four predetermined locations of the wall element 504 around the perimeter which engage in four cutouts in the housing 502. This means that the wall element 504 is secured against slipping which can be caused e.g. by vibrations of the housing 502. A particularly stable purchase is achieved if the securing element 505 is implemented all-round. Simple dismantling of the wall element 504 is likewise ensured as the securing element 505 can be disengaged by gently pressing back the wall element 504. An alternative embodiment of the securing element is denoted by the reference sign 506, wherein the securing element 506 has the shape of a spring which engages in the cutout 507. The securing element 506 in the form of a spring is e.g. bonded or riveted to an area of the wall element 504 facing the housing 502. However, a securing element 505 or 506 does not need to engage in the cutout 507 which is provided for routing the pipes/cables 501 out of the housing 502. The securing elements can alternatively engage in cutouts specially provided for this purpose in the housing 502.

The invention claimed is:

1. An enclosure for pipes/cables of a medical diagnostic device, comprising:
   a wall element with folds that is adapted to be folded at the folds around the pipes/cables and surrounds the pipes/cables; and
   a molding having a U-shaped section or an angular section and mounted to the wall element, wherein a leg is formed at meeting wall element edges of the wall element and extends inward from the meeting wall element edge in a direction of the pipes/cables, wherein the molding comprises a further leg abutting an inner perimeter of the enclosure, wherein the further leg comprises two tab-shaped sections and inwardly abuts the leg, and wherein the two tab-shaped sections are bent in the direction of the pipes/cables; or
   a molding having an H-shaped section with two opposite grooves, wherein the molding connects meeting wall element edges of the wall element and the grooves at least partially accommodate the meeting wall element edges.

2. The enclosure as claimed in claim 1, wherein the wall element comprises a planar element, a shape-stabilizing element, and a cavity between the planar element and the shape-stabilizing element.

3. The enclosure as claimed in claim 1, wherein the wall element comprises an inner skin, an outer skin, and an intermediate honeycomb structure.

4. The enclosure as claimed in claim 1, wherein the wall element comprises a corrugated board.

5. The enclosure as claimed in claim 1, wherein the wall element comprises a polypropylene hollow board.

6. The enclosure as claimed in claim 1, wherein the wall element comprises a synthetic-resin-coated, a laminated, or a synthetic-resin-impregnated board.

7. The enclosure as claimed in claim 1, wherein a fireproofing paint is provided on a surface of the wall element.

8. The enclosure as claimed in claim 1, wherein a fireproofing element is provided at a predetermined distance from an internal perimeter of the wall element.

9. The enclosure as claimed in claim 1, wherein the enclosure is inserted in a cutout on a housing of the medical diagnostic device.

10. The enclosure as claimed in claim 1, wherein the wall element comprises meeting wall element edges that are connected by a snap button, or a hook-and-loop fastener, or a retaining bracket, or a hook and eye, or a guide aid, or a combination thereof.

11. The enclosure as claimed in claim 1, wherein the wall element comprises a securing element facing the medical diagnostic device that is held in a cutout on a housing of the medical diagnostic device.

12. A housing of a medical diagnostic device, comprising:
    an enclosure comprising:
      a wall element with folds that is adapted to be folded at the folds around the pipes/cables of the medical diagnostic device and surrounds the pipes/cables; and
      a molding having a U-shaped section or an angular section and mounted to the wall element, wherein a leg is formed at meeting wall element edges of the wall element and extends inward from the meeting wall element edge in a direction of the pipes/cables, wherein the molding comprises a further leg abutting an inner perimeter of the enclosure, wherein the further leg comprises two tab-shaped sections and inwardly abuts the leg, and wherein the two tab-shaped sections are bent in the direction of the pipes/cables; or
      a molding having an H-shaped section with two opposite grooves, wherein the molding connects meeting wall element edges of the wall element and the grooves at least partially accommodate the meeting wall element edges; and
    a molded shape that accommodates the enclosure.

13. The housing as claimed in claim 12, wherein the molded shape is a single piece with the housing.

* * * * *